(12) United States Patent
Yoshida et al.

(10) Patent No.: US 9,075,592 B2
(45) Date of Patent: Jul. 7, 2015

(54) INFORMATION PROCESSING SYSTEM, UNINTERRUPTIBLE POWER SYSTEM, AND METHOD FOR CONTROLLING ALLOCATION OF PROCESSING

(71) Applicant: FUJITSU LIMITED, Kawasaki-shi, Kanagawa (JP)

(72) Inventors: Kensuke Yoshida, Kawasaki (JP);
Tsutomu Tanaka, Kawasaki (JP);
Tomochika Kurita, Kawasaki (JP);
Tamotsu Yamamoto, Kawasaki (JP);
Masaaki Sasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 251 days.

(21) Appl. No.: 13/719,822

(22) Filed: Dec. 19, 2012

(65) Prior Publication Data

US 2013/0111252 A1 May 2, 2013

Related U.S. Application Data

(63) Continuation of application No. PCT/JP2010/062550, filed on Jul. 26, 2010.

(51) Int. Cl.
 *G06F 1/26* (2006.01)
 *G06F 1/30* (2006.01)
 *H02J 9/06* (2006.01)
 (Continued)

(52) U.S. Cl.
 CPC ........ *G06F 1/263* (2013.01); *G06F 1/30* (2013.01); *H02J 9/061* (2013.01); *G06F 9/5094* (2013.01); *H02J 9/00* (2013.01); *H02J 1/14* (2013.01)

(58) Field of Classification Search
 CPC .............. G06F 1/26; G06F 9/50; H02J 9/00
 USPC ....................................................... 713/340
 See application file for complete search history.

(56) References Cited

U.S. PATENT DOCUMENTS

| 6,225,708 B1 | 5/2001 | Furukawa |
| 6,760,846 B1 | 7/2004 | Yoshida |

(Continued)

FOREIGN PATENT DOCUMENTS

| JP | H11-202988 | 7/1999 |
| JP | 2000-14043 | 1/2000 |

(Continued)

OTHER PUBLICATIONS

International Search Report for International Application No. PCT/JP2010/062550 dated Oct. 19, 2010.

*Primary Examiner* — Vincent Tran
(74) *Attorney, Agent, or Firm* — Kratz, Quintos & Hanson, LLP (57) ABSTRACT

An information processing system includes: a plurality of information processing devices; a plurality of power storage devices configured to supply DC power to any of the plurality of information processing devices; a plurality power source devices configured to supply DC power to the plurality of power storage devices; and an arithmetic unit configured to, in accordance with the charged state of any of the plurality of power storage devices and a task to be processed by the information processing device to which DC power is supplied from the power storage device, allocating the task to be processed by the information processing device to an information processing device to which DC power is not supplied from the power storage device.

6 Claims, 6 Drawing Sheets (51) Int. Cl.
*G06F 9/50* (2006.01)
*H02J 9/00* (2006.01)
*H02J 1/14* (2006.01)

(56) References Cited

U.S. PATENT DOCUMENTS

| 8,700,929 | B1 * | 4/2014 | Weber et al. | 713/310 |
| 2005/0229037 | A1 * | 10/2005 | Egan et al. | 714/14 |
| 2009/0119233 | A1 * | 5/2009 | Dunagan et al. | 705/412 |
| 2009/0239480 | A1 * | 9/2009 | Rofougaran et al. | 455/73 |
| 2011/0010518 | A1 * | 1/2011 | Kavuri et al. | 711/165 |
| 2011/0143811 | A1 * | 6/2011 | Rodriguez | 455/556.1 |

FOREIGN PATENT DOCUMENTS

| JP | 2000-293923 | | 10/2000 |
| JP | 2003-79067 | A1 | 3/2003 |
| JP | 2010-9538 | A1 | 1/2010 |

* cited by examiner

INFORMATION PROCESSING SYSTEM, UNINTERRUPTIBLE POWER SYSTEM, AND METHOD FOR CONTROLLING ALLOCATION OF PROCESSING

CROSS-REFERENCE TO RELATED APPLICATIONS

This application is a continuation application of Internal Application PCT/JP2010/062550 filed on Jul. 26, 2010, and designated the U.S., the entire contents of which are incorporated herein by reference.

FIELD

The embodiments discussed herein are related to an information processing system to which a power source is supplied by an uninterruptible power system, an uninterruptible power system, and a method for controlling allocation of processing.

BACKGROUND

An uninterruptible power supply (system) configured to continue supply of power to equipment connected therewith for a fixed period of time without power failure even if the input power source fails is used widely.

For example, it is common for a computer system to receive power supply from a commercial power source. In the computer system when the power source fails, even if instantaneously, a large-scale malfunction occurs, and therefore, an uninterruptible power system is used to prevent an instantaneous voltage drop or power failure even if the commercial power source with which the computer system is connected fails. In addition to the computer system, there exist various facilities and equipment for which even an instantaneous power failure will cause a large-scale malfunction, such as hospitals and plants, and medical equipment, control equipment, and sensors, used in such facilities. Generally, such facilities and equipment comprise an uninterruptible power system. Hereinafter, explanation is given using an Internet Data Center (IDC) as an example, however, the following explanation is not limited to this. The Internet Data Center (IDC) has a plurality of processor units and a computer system that performs processing in parallel.

The uninterruptible power system stores power and maintains supply of power to equipment by supplying stored power to the equipment when supply of power is cut off. To store power, a secondary battery or an electric double layer capacitor is used, however, either requires DC power. Hereinafter, the secondary battery and the electric double capacitor are generally referred to as a secondary battery. Further, the whole of the uninterruptible power supply is sometimes referred to as UPS (Uninterruptible Power Supply), however, the portion that stores power is sometimes called UPS. In the following explanation, a power storage device that stores power is referred to as UPS.

The uninterruptible power system includes an alternating-current (AC) power supply type and a direct-current (DC) power supply type. When the uninterruptible power system is used for the power source of the whole of a facility, an AC power supply uninterruptible power system is used in view of distribution of power etc. within the facility. However, when the uninterruptible power system is used for the power source of the whole of the facility, the capacity and weight of the system become very large. For example, when the uninterruptible power system is used for the power source of the whole of the Internet data center (IDC), the uninterruptible power system is provided on the floor corresponding to one story and the computer system is provided on the next upper or lower floor.

In the AC power supply uninterruptible power system, the AC commercial power is once converted into DC power and to the output of the DC power, UPS is connected. Then, the output of the DC power is converted into AC power and supplied to each part in the form of AC power. Equipment (processor unit) to which AC power is supplied operates on DC current, and therefore, the supplied AC power is converted into DC power again and supplied to the equipment (processor unit). Consequently, when the AC power supply uninterruptible power system is used in the Internet data center (IDC), conversion is performed three times, that is, AC/DC conversion, DC/AC conversion, and AC/DC conversion. Because of this, for the AC power supply, there has been such a problem that power loss accompanying conversion is large and efficiency is low. Further, there has been a problem that the size of UPS is large.

Equipment to which AC power is supplied is referred to as AC equipment and equipment to which DC power is supplied and which operates on DC power is referred to as DC equipment. AC equipment having DC system unit inside thereof has an AC/DC converter to which AC power is supplied from outside and which is configured to convert AC power into DC power inside thereof. The DC system unit provided inside of the AC equipment is sometimes referred to as DC equipment.

For power saving and a reduction in environmental load of the Internet data center (IDC), development of the technique relating to DC power supply and power load leveling is promoted.

In the DC power supply, AC commercial power is converted into DC power, UPS is connected to the output of the DC power, and the DC power is supplied to the equipment (processor unit). UPS in this case is referred to as DC-UPS. In this case, conversion is performed once and the loss of power accompanying conversion can be reduced, and therefore, it is possible to make an attempt to save energy. However, from a converter from AC power into DC power, DC power is supplied to each piece of DC equipment, and therefore, the voltage drop and the loss of power accompanying distribution of power are problems.

On the other hand, the power load leveling is the technique to compensate for and suppress fluctuations in system power and power consumption by charging and discharging the power storage device by also providing a large capacity power storage device in order to match the system power originating from recycled energy and atomic power, the environmental load of which is low but the output control of which is difficult, with fluctuations in power consumption of the equipment.

In order to implement these DC power supply and power load leveling technique, there is a DC power supply uninterruptible power supply (DC-UPS) in which a power storage device is installed in the DC system unit inside of the AC equipment. DC-UPS is charged by DC power from the AC/DC converter provided in the AC equipment and the discharged power from DC-UPS is supplied to the DC system unit within the equipment as DC power without conversion. According to this power supply system, it is possible to implement DC power supply inside of large-sized information equipment without converting power to be supplied to the whole of IDC into DC power, and therefore, power saving is enabled. Further, according to this power supply system, DC-UPS has only the secondary battery and a charge/discharge control circuit and the DC/AC conversion circuit is not provided and by additionally providing a power storage device in the space once used for the DC/AC conversion circuit, it is made possible to implement UPS with a power capacity by which it is possible to back up large-sized information equipment and to level a power load.

As described above, in the case of AC power supply, the AC power supplied to the facility is supplied once to AC equipment via the AC power supply uninterruptible power supply (AC-UPS) and is subjected to AC/DC conversion inside of the AC equipment (built-in power source unit). The DC power is supplied to the DC system unit inside of the equipment after further converting into DC power of a desired voltage by DC/DC conversion in correspondence to the equipment drive voltage.

On the other hand, in the case of DC power supply, the AC power supplied to the facility is supplied directly to the AC equipment and connected to DC-UPS by drawing the DC power subjected to AC/DC conversion inside of the AC equipment (built-in power source unit). The DC output of DC-UPS is supplied to the DC/DC converter and after converted into DC power of a desired voltage in correspondence to the drive voltage inside of the equipment, is supplied to the DC system unit inside of the equipment.

RELATED DOCUMENTS

[Patent Document 1] Japanese Laid-open Patent Publication No. 2000-293923
[Patent Document 2] Japanese Laid-open Patent Publication No. 2000-014043

SUMMARY

According to an aspect of the embodiments, an information processing system includes: a plurality of information processing devices; a plurality of power storage devices configured to supply DC power to any of the plurality of information processing devices; a plurality power source devices configured to supply DC power to the plurality of power storage devices; and an arithmetic unit configured to, in accordance with the charged state of any of the plurality of power storage devices and an amount of a task to be processed by the information processing device to which DC power is supplied from the power storage device, allocate the task to be processed by the information processing device to an information processing device to which DC power is not supplied from the power storage device.

The object and advantages of the embodiments will be realized and attained by means of the elements and combination particularly pointed out in the claims.

It is to be understood that both the foregoing general description and the following detailed description are exemplary and explanatory and are not restrictive of the invention.

DESCRIPTION OF EMBODIMENTS

It is preferable for UPS that the power storage device be always in the fully changed state because of the purpose of the backup function. If the power storage device becomes no longer in the fully charged state due to some malfunction, it is preferable for the power storage device to quickly return to the fully charged state.

As power to charge UPS, AC power for in-house use having a sufficient power supply capability is used for AC-UPS, however, for DC-UPS, surplus power is used, which is the maximum output capacity of the built-in power source unit from which the power consumed in equipment is subtracted. However, the maximum output capacity of the built-in power source unit provided originally in the AC equipment is designed so as to adapt to the maximum power consumption of the built-in DC equipment (DC system unit), and therefore, when the built-in DC equipment operates on the maximum power consumption, surplus power is hardly generated. If DC-UPS is installed so as to make use of the DC output of such a built-in power source unit, the power to charge DC-UPS greatly depends on the operating state of the DC equipment (=power consumption). Because of this, the charge time of DC-UPS is not stabilized and it is difficult to implement the backup function and the power load leveling function of the equipment.

When a new built-in power source unit, the maximum output capacity of which has been increased, is used in order to sufficiently secure the power to charge DC-UPS, the increase in the maximum output capacity is accompanied by the increase in size of the unit, and therefore, compatibility of equipment will be lost as a result.

As described above, in order to make an attempt to save power and to level the power load, it has been desired for DC-UPS to achieve a sufficient backup function without increasing the size of the built-in power source unit.

Hereinafter, explanation is given using the Internet data center (IDC) as an example, however, the following explanation is not limited to this.

Figure 1:
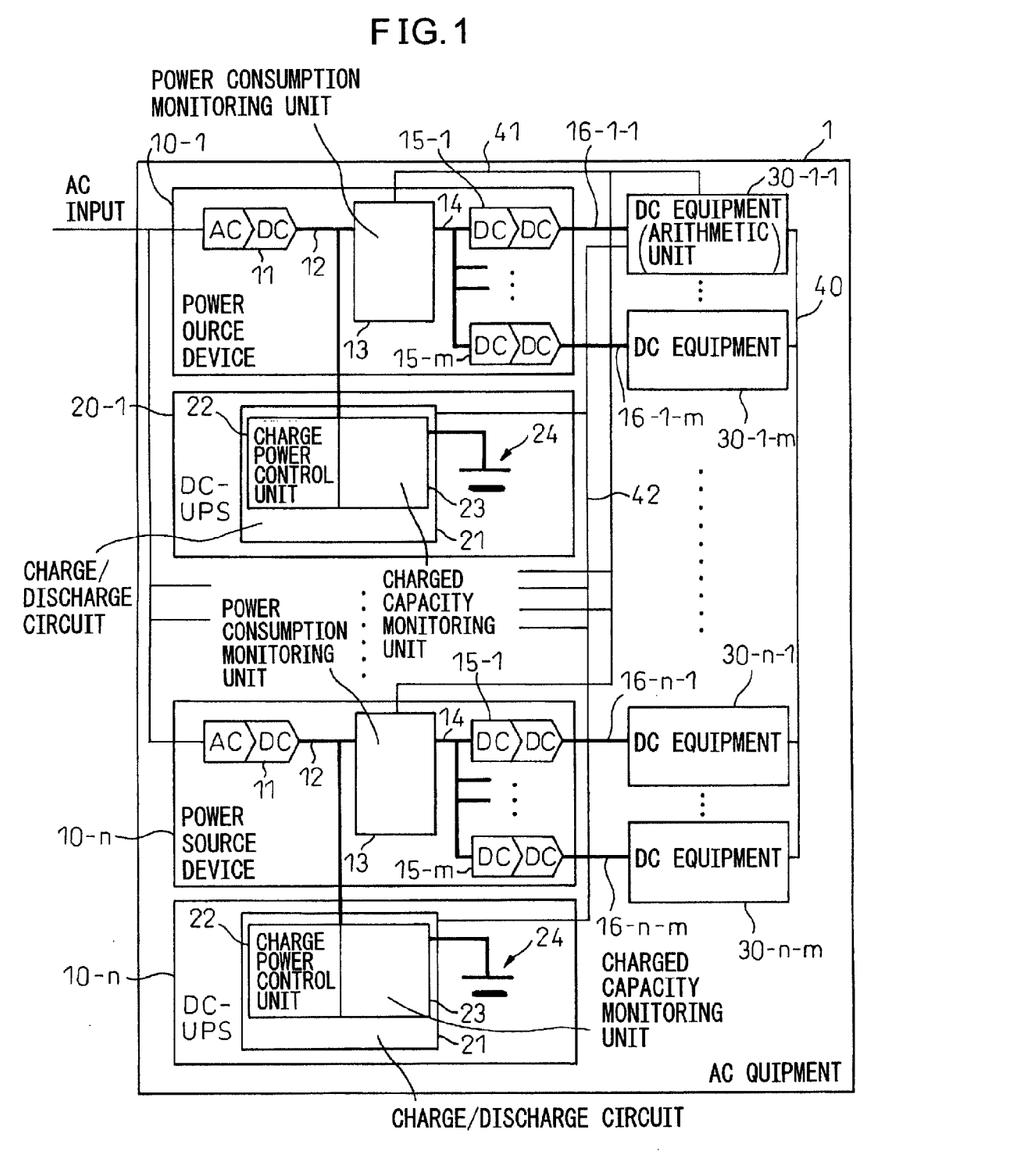
FIG. 1 is a diagram illustrating a configuration of AC equipment forming the Internet data center (IDC) of an embodiment.

FIG. 1 is a diagram illustrating a configuration of AC equipment 1 forming the Internet data center (IDC) of an embodiment. It may also be possible to form IDC by a piece of DC equipment or by a plurality of pieces of DC equipment.

As illustrated in FIG. 1, the AC equipment 1 has a pair of power source device (unit) 10-1 and DC-UPS 20-1 to a pair of power source 10-n and DC-UPS 20-n in n systems and a plurality of pieces of DC equipment. The plurality of pieces of DC equipment is divided into sets of n systems corresponding to the power source units 10-1 to 10-n in n systems and each set of pieces of DC equipment of each system has m pieces of DC equipment. Here, DC equipment 30-i-j is the j-th DC equipment belonging to the i-th set of the n systems.

To the power source units 10-1 to 10-n, an AC input supplied to the AC equipment 1 from outside is supplied. The AC input is, for example, the commercial AC power. Each power source unit 10 has an AC/DC converter 11, a first DC power source line 12, a power consumption monitoring unit 13, a second DC power source line 14, and m DC-DC converters 15-1 to 15-m. The AC/DC converter 11 converts the AC commercial power into DC power of a predetermined voltage. For example, the voltage of the AC commercial power is AC 200 V and the predetermined voltage of the DC power is 400 V. However, not limited to these values and AC 100 V may be accepted and the predetermined voltage may be 40 V etc. The first DC power source line 12 is the output line of the AC/DC converter 11 and connected to the power consumption monitoring unit 13. The power consumption monitoring unit 13 monitors power supplied through the first DC power source line 12. The second DC power source line 14 connects the power consumption monitoring unit 13 and the DC-DC converters 15-1 to 15-m and is branched into m lines on the way. The DC-DC converters 15-1 to 15-m convert the DC power of a predetermined voltage supplied via the second DC power source line 14 into DC power of a voltage used by corresponding DC equipment. The DC-DC converters 15-1 to 15-m may sometimes output different voltages and my sometimes output the same voltage. To the outputs of the DC-DC converters 15-1 to 15-m, output lines 16-1-1 to 16-1-m, ..., 16-n-1 to 16-n-m are connected. The DC equipment 30-i-j is connected to the corresponding output line 16-i-j and DC power is supplied.

Each DC-UPS 20 has a charge/discharge circuit 21 connected to the first DC power source line 12 of the corresponding power source unit 10 and a power storage device 24 configured to charge and discharge via the charge/discharge circuit 21. The charge/discharge circuit 21 has a charge power control unit 22 and a charged capacity monitoring unit 23. The power storage unit 24 is configured by a secondary battery etc.

Each piece of DC equipment 30 is a processor unit. A plurality of pieces of the DC converters 30 is connected to one another by a bus 40 and forms a computer system of a multiprocessor configuration in which processing (task) is distributed and performed in parallel. In the embodiment, one piece of the DC equipment (here, the DC equipment 30-1-1) of the plurality of pieces of the DC equipment 30 is made use of as an arithmetic unit configured to perform control of the whole. The DC equipment (arithmetic unit) 30-1-1 performs part of the task and at the same time, performs the processing of the whole of the computer system, such as allocation of task to each piece of the DC equipment, and further, monitors the power source units 10-1 to 10-n and the DC-UPSs 20-1 to 20-n. Because of this, it is possible for the DC equipment (arithmetic unit) 30-1-1 to collect the measurement result of the power consumption of the power consumption monitoring unit 13 of each power source unit via a communication line 41 and the measurement result of the charged capacity of the charged capacity monitoring unit 23 of each DC-UPS via a communication line 42. The DC equipment (arithmetic unit) 30-1-1 calculates the preferable charge condition of each system based on the measurement result of the collected power consumption of the n systems and the measurement result of the collected charged capacity and sets the charge condition to the charge power control unit 22 of each system. It may also be possible to implement the arithmetic unit by another processor unit instead of implementing by part of the DC equipment.

Figure 2:
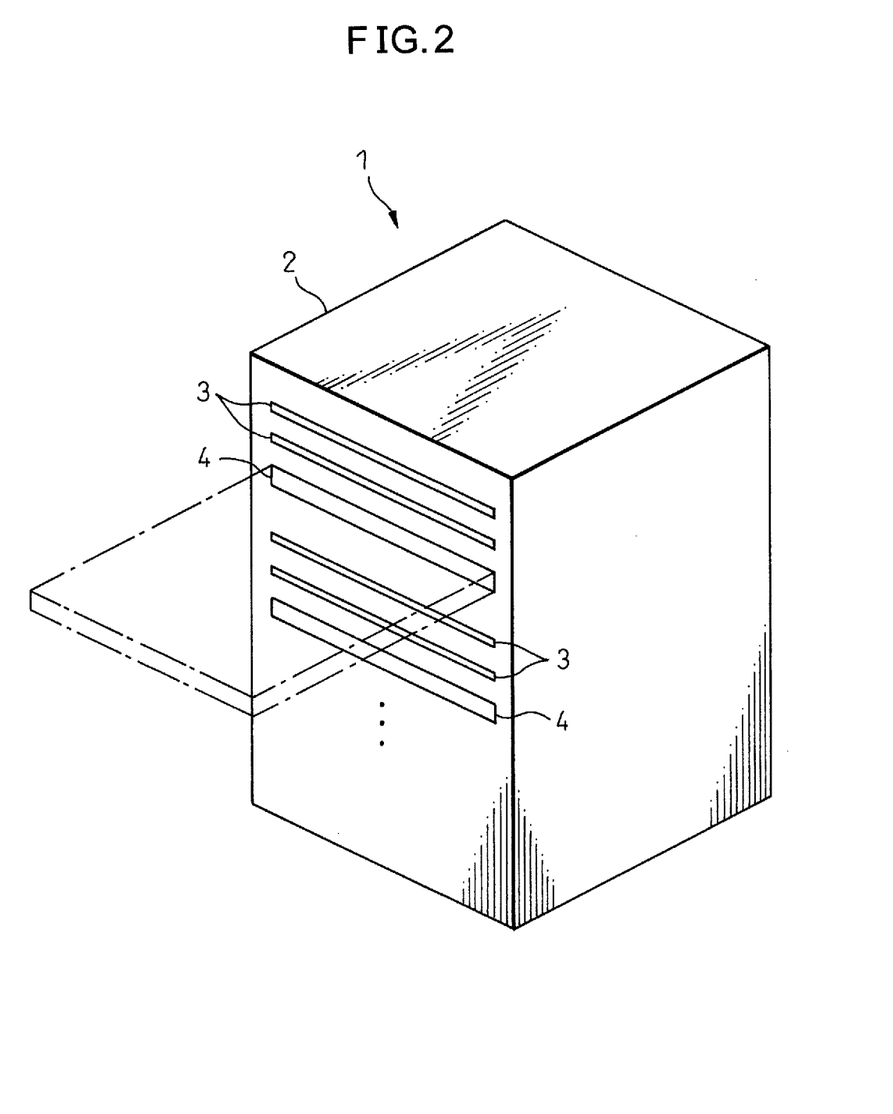
FIG. 2 is an external view of the AC equipment of the embodiment.

FIG. 2 is an external view of the AC equipment 1 of the embodiment. The AC equipment 1 has a case (frame) 2 in which a plurality of guides is formed and an arithmetic board 3 on which the DC equipment 30 is mounted and a power source board 4 on which the power source unit 10 and the DC-UPS 20 are mounted are inserted along the guide. The inserted arithmetic board 3 and the power source board 4 are connected to each other via a connector (not illustrated schematically) provided on the back surface. The two arithmetic boards 3 and the one power source board 4 form a set and it is possible to arbitrarily set the number of sets of the arithmetic board 3 and the power source board 4 mounted in accordance with specifications. A plurality of AC equipments, each is the AC equipment 1 illustrated in FIG. 2, are arranged and connected to one another.

Figure 3:
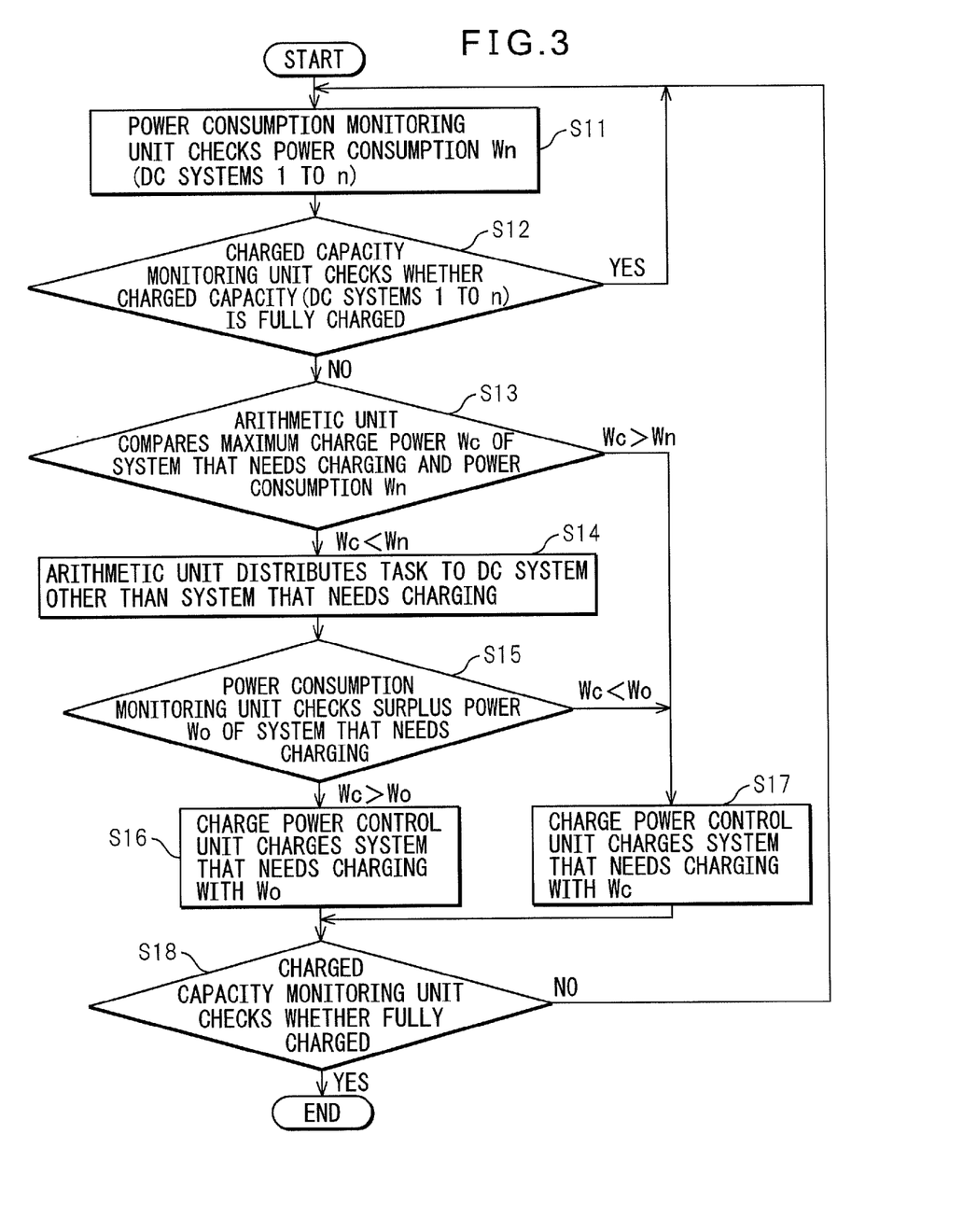
FIG. 3 is a flowchart illustrating the control of the DC equipment that operates as the arithmetic unit in the AC equipment of the embodiment.

FIG. 3 is a flowchart illustrating the control of the DC equipment 30-1-1 that operates as the arithmetic unit in the AC equipment 1 of the embodiment.

In step S11, the power consumption monitoring unit 13 of each system monitors power consumption Wn of each system and transmits the measurement result to the DC equipment (arithmetic unit) 30-1-1 by communication.

In step S12, the charged capacity monitoring unit 23 of each system monitors the charged capacity of the power storage device 24 inside of DC-UPS and transmits the measurement result to the DC equipment (arithmetic unit) 30-1-1 by communication. When the measurement result indicates that all the power storage devices 24 are in the fully charged state, the procedure returns to step S11 and monitoring of the power consumption and the charged capacity is continued as before and when the measurement result indicates that part of the power storage devices 24 are not in the fully charged state, the procedure proceeds to step S13.

In step S13, the DC equipment (arithmetic unit) 30-1-1 compares maximum charge power Wc of the system that needs charging and the power consumption Wn of the system and when Wc>Wn, the procedure proceeds to step S17 and when Wc<Wn, the procedure proceeds to step S14.

In step S14, the DC equipment (arithmetic unit) 30-1-1 transmits a command to distribute the task to the DC equipment connected to DC-UPS and the power source circuit of the system other than the system that needs charging to reduce the power consumption of the system that needs charging.

In step S15, the power consumption monitoring unit 13 of the system that needs charging monitors the power consumption Wn and calculates surplus power Wo, which is a difference between the power consumption Wn and the maximum output capacity Wc of the power source unit of the system, and compares the surplus power Wo with the maximum charge power Wc. When Wc<Wo, the procedure proceeds to step S17 and when Wc>Wo, the procedure proceeds to step S16.

In step S16, the charge power control unit 22 performs control so that the power source device 24 is charged with the surplus power Wo.

In step S17, the charge power control unit 22 performs control so that the power source device 24 is charged with the maximum charge power Wc.

In step S18, the charged capacity monitoring unit 23 monitors the charged state of the power storage device during charging and exits charging when fully charged and when not fully charged, the procedure returns to step S11 to adjust the charge condition based on the power consumption Wn and the charged capacity of the DC system.

FIG. 4 to FIG. 6B are diagrams explaining the charging operation in the embodiment and here, explanation is given using a case where the sets of the power source device 10 and the DC-UPS 20 of the three systems are provided as an example. In this example, the maximum output capacity of the power source unit 10 is assumed to be 9 and the maximum power consumption of the DC equipment to be 8.

Figure 4:
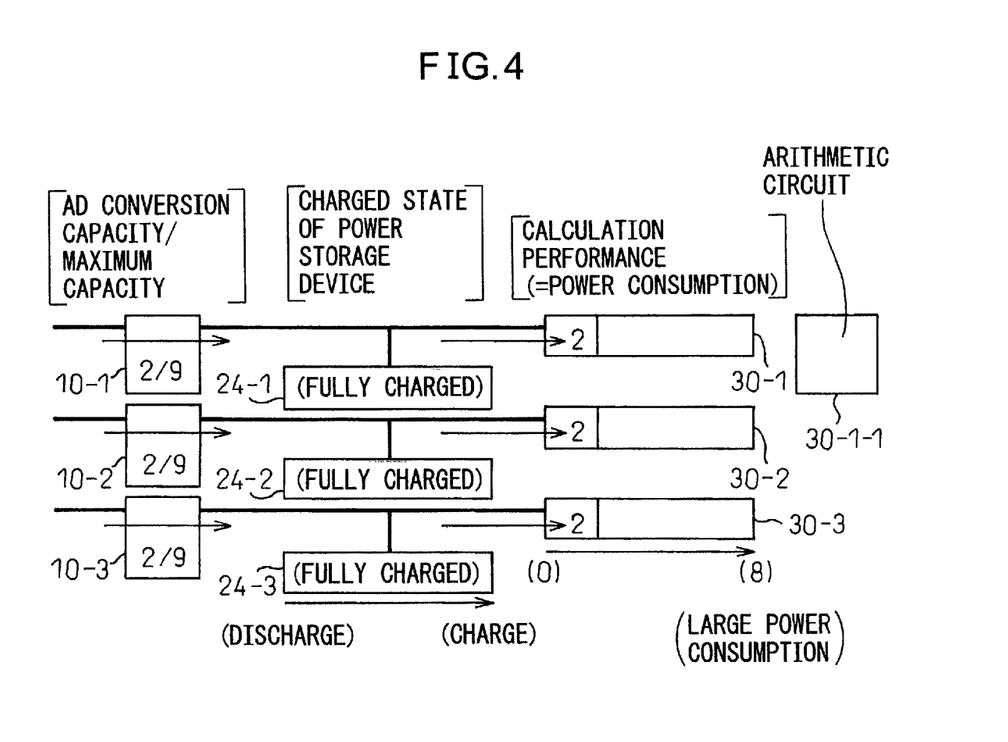
FIG. 4 is a diagram explaining the charging operation in the embodiment.

FIG. 4 illustrates an operation example when all the power source devices 24 of DC-UPSs 20 of the three systems are in the fully charged state and operating stably in the state where the power consumption is small (power consumption 2). When the power source device 24 is in the fully charged state, the power source unit 10 supplies only the power consumption 2 of the DC equipment 30.

Figure 5A:
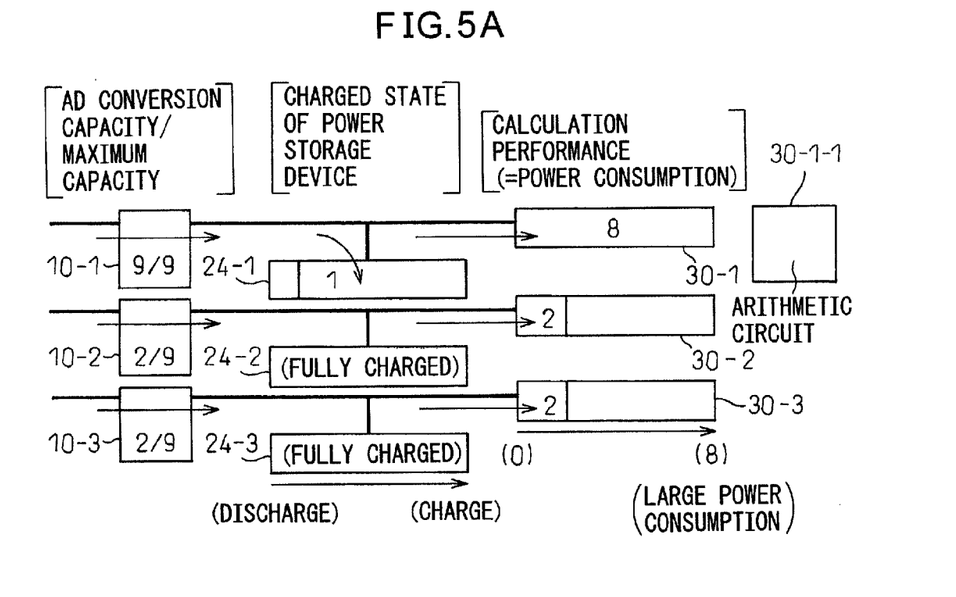
FIG. 5A is a diagram explaining the charging operation in the embodiment.

FIG. 5A illustrates an example of the state where the charged capacity of a power storage device 24-1 of one system is reduced and the power consumption of the DC equipment 30-1 is large (power consumption 8) and the charged capacity of power storage devices 24-2 and 24-3 of the other two systems is in the fully charged state and the power consumption is small (power consumption 2). In this case, the state is such that the power source unit 10-1 preferentially supplies power to the DC equipment, and therefore, the power source unit 10-1 supplies power of the maximum output capacity 9, however, as the charge power to the power storage device 24-1, only the surplus power 1 can be supplied. In such a situation, it takes time to recover the charged capacity of the power storage device 24-1.

Figure 5B:
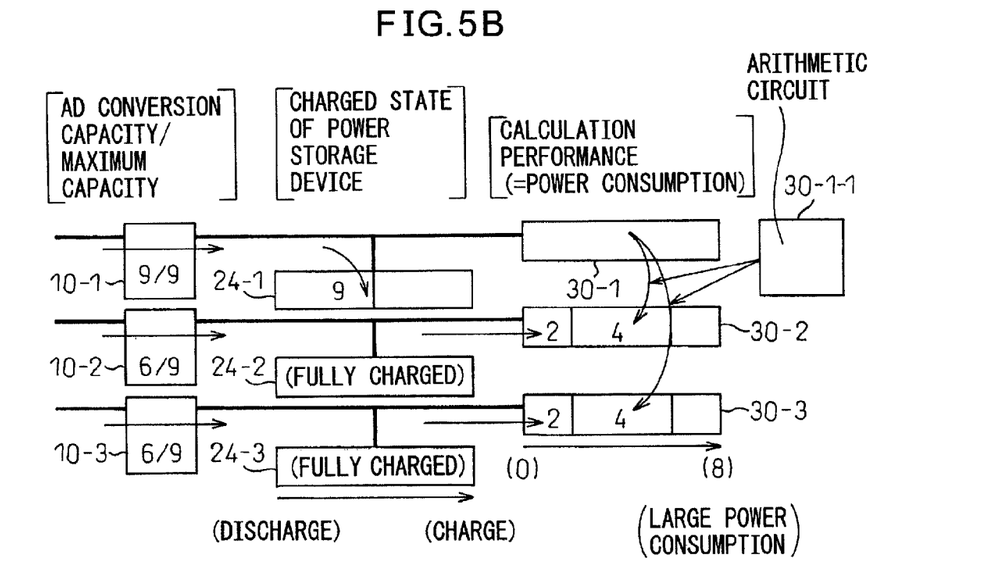
FIG. 5B is a diagram explaining the charging operation in the embodiment.

FIG. 5B illustrates a state into which the state of FIG. 5A has changed by the present embodiment. According to the present embodiment, when detecting a reduction in the charged capacity of the power storage device 24-1, the DC equipment (arithmetic unit) 30-1-1 reduces the task performed by the DC equipment 30-1 after allocating the task performed by the corresponding DC equipment 30-1 to the other DC equipment 30-2 and 30-3. In FIG. 5B, the task performed by the DC equipment 30-1 is reduced from 8 to 0 and the task performed by the DC equipment 30-2 and 30-3 is increased from 2 to 6. Further, the charge power to the power storage device 24-1 is increased to 9 and all of the maximum output capacity 9 of the power source unit 10-1 is used as the charge power of the power storage device 24-1.

Figure 6A:
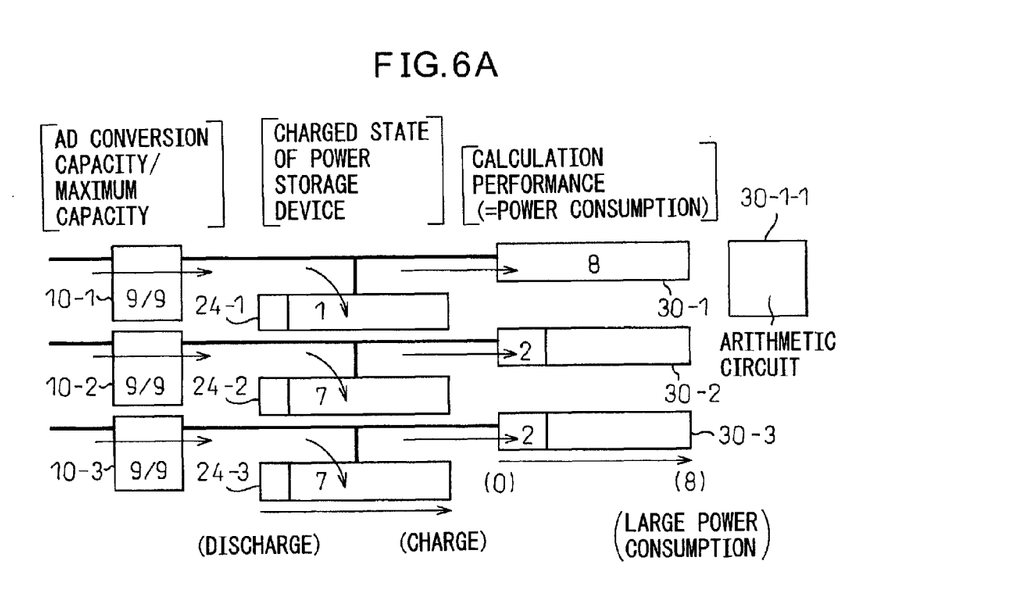
FIG. 6A is a diagram explaining the charging operation in the embodiment.

FIG. 6A illustrates the state where the charged capacity of all the power storage devices 24-1 to 24-3 of the three systems is reduced, the power consumption of the DC equipment 30-1 is large (power consumption 8), and the power consumption of the DC equipment 30-2 and 30-3 is comparatively small (power consumption 2). Priority is given to the power supply to the DC equipment, and therefore, while in the system in which power consumption is small, it is possible to charge the power storage devices 24-2 and 24-3 with charge power 7, in the system in which power consumption is large, the power storage device 24-1 is charged only with charge power 1, and as a result, there arises a difference in the backup performance between the power sources of the three system.

Figure 6B:
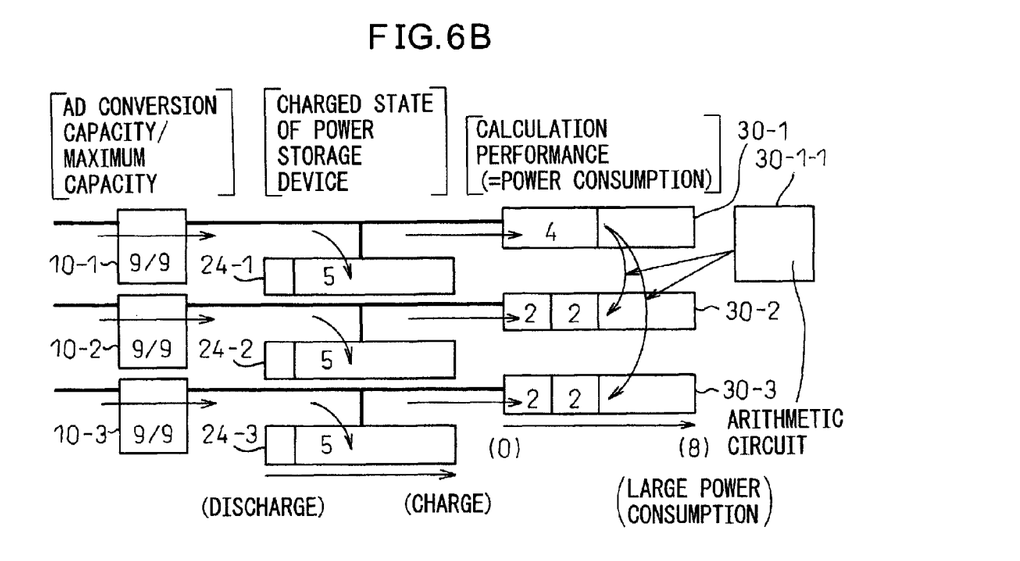
FIG. 6B is a diagram explaining the charging operation in the embodiment.

FIG. 6B illustrates a state into which the state of FIG. 6A has changed by the present embodiment. According to the present embodiment, when detecting a reduction in the charged capacity of the power storage devices 24-1 to 24-3, the DC equipment (arithmetic unit) 30-1-1 distributes the task of the DC equipment 30-1 the task of which is large to the other DC equipment 30-2 and 30-3 to make uniform the task thereof. After that, the charge power to all the power storage devices 24-1 to 24-3 is made uniform and the backup performance of the power sources of the three systems is made uniform.

As explained above, according to the present embodiment, by monitoring power consumption of a plurality of pieces of DC equipment, surplus power of the AC/DC conversion circuit of each piece of equipment is monitored and power consumption is concentrated or distributed to part of the DC equipment by the arithmetic unit. Due to this, when the charged capacity of the power storage device inside of the DC-UPS corresponding to certain DC equipment is reduced, it is made possible to sufficiently secure the charge power to DC-UPS by the arithmetic unit distributing the load (task) of the corresponding DC equipment to different DC equipment to increase the surplus power of the power source unit corresponding to the DC equipment. Further, when the charged capacity of the power source devices corresponding to a number of pieces of DC equipment is reduced, it is possible to secure the charge power to the power storage device by the arithmetic unit equally distributing the load to a plurality of pieces of DC equipment to increase the surplus power of the power source unit corresponding to each piece of DC equipment. Furthermore, when the DC equipment is a computer capable of allocating a virtualized resource to a plurality of physical servers, it is possible to obtain the above-mentioned effect by allocating the virtualized resource based on the charged state of the power storage device built in each piece of equipment.

In other words, according to the embodiment, control is performed so that a small amount of task (load) is allocated to an information processing device (DC equipment) corresponding to a power storage device in an insufficiently charged state, and therefore, the power consumption in the information processing device (DC equipment) is reduced. Consequently, it is possible to increase the surplus power, which is the maximum output capacity of the built-in power source unit from which the power consumption of the equipment is subtracted, and to bring the power storage device in the insufficiently charged state into the fully charged state in a brief time.

As explained above, in the present embodiment, it is made possible to secure the charge power of DC-UPS by managing power consumption of a plurality of pieces of DC equipment without increasing the output capacity of the power source unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing system comprising:
a plurality of information processing devices;
a plurality of power storage devices configured to supply DC power to any of the plurality of information processing devices;
a plurality of power source devices configured to supply DC power to the plurality of power storage devices; and
an arithmetic unit configured to, in accordance with the charged state of any of the plurality of power storage devices and an amount of a task to be processed by the information processing device to which DC power is supplied from the power storage device, allocate the task to be processed by the information processing device to an information processing device to which DC power is not supplied from the power storage device, wherein
the power source device includes a power consumption monitoring unit configured to monitor power consumption of the corresponding information processing device,
the power storage device includes a charge power control unit configured to control the storage of DC power from the power source device and a charged capacity monitoring unit configured to monitor the charged capacity, and the arithmetic unit collects the power consumption of the information processing device detected by the power consumption monitoring unit and the charged capacity detected by the charged capacity monitoring unit.

2. An information processing system comprising:
a plurality of information processing devices;
a plurality of power storage devices configured to supply DC power to any of the plurality of information processing devices;
a plurality of power source devices configured to supply DC power to the plurality of power storage devices; and
an arithmetic unit configured to, in accordance with the charged state of any of the plurality of power storage devices and an amount of a task to be processed by the information processing device to which DC power is supplied from the power storage device, allocate the task to be processed by the information processing device to an information processing device to which DC power is not supplied from the power storage device, wherein
the arithmetic unit allocates an amount of the task to the information processing device corresponding to the power storage device the charged state of which is lower than that of the other power storage devices less than the amount of the task of the other information processing devices.

3. An information processing system comprising:
a plurality of information processing devices configured to distribute and process a task;
a plurality of power source devices provided in correspondence to the plurality of information processing devices and configured to supply DC power to the corresponding information processing device;
a plurality of power storage devices provided in correspondence to the plurality of information processing devices and configured to back up DC power from the corresponding power source device; and
an arithmetic unit configured to allocate the task to the plurality of information processing devices in accordance with the charged state of the plurality of power storage devices, wherein
the power source device includes a power consumption monitoring unit configured to monitor power consumption of the corresponding information processing device,
the power storage device includes a charge power control unit configured to control the storage of DC power from the power source device and a charged capacity monitoring unit configured to monitor the charged capacity, and
the arithmetic unit collects the power consumption of the information processing device detected by the power consumption monitoring unit and the charged capacity detected by the charged capacity monitoring unit.

4. An information processing system comprising:
a plurality of information processing devices configured to distribute and process a task;
a plurality of power source devices provided in correspondence to the plurality of information processing devices and configured to supply DC power to the corresponding information processing device;
a plurality of power storage devices provided in correspondence to the plurality of information processing devices and configured to back up DC power from the corresponding power source device; and
an arithmetic unit configured to allocate the task to the plurality of information processing devices in accordance with the charged state of the plurality of power storage devices, wherein
the arithmetic unit allocates an amount of the task to the information processing device corresponding to the power storage device the charged state of which is lower than that of the other power storage devices less than the amount of the task of the other information processing devices.

5. An uninterruptible power system comprising:
a plurality of power source devices provided in correspondence to a plurality of pieces of DC equipment configured to perform processing in collaboration with one another and configured to supply DC power to the corresponding DC equipment;
a plurality of power storage devices provided in correspondence to the plurality of pieces of DC equipment and configured to back up DC power from the corresponding power source device; and
a control unit configured to allocate the processing to the plurality of pieces of DC equipment in accordance with the charged state of the plurality of power storage devices, wherein
the power source device includes a power consumption monitoring unit configured to monitor power consumption of the corresponding DC equipment,
the power storage device includes a charge power control unit configured to control the storage of DC power from the power source device and a charged capacity monitoring unit configured to monitor the charged capacity, and
the control unit collects the power consumption of the DC equipment detected by the power consumption monitoring unit and the charged capacity detected by the charged capacity monitoring unit.

6. An uninterruptible power system comprising:
a plurality of power source devices provided in correspondence to a plurality of pieces of DC equipment configured to perform processing in collaboration with one another and configured to supply DC power to the corresponding DC equipment;
a plurality of power storage devices provided in correspondence to the plurality of pieces of DC equipment and configured to back up DC power from the corresponding power source device; and
a control unit configured to allocate the processing to the plurality of pieces of DC equipment in accordance with the charged state of the plurality of power storage devices, wherein
the control unit allocates an amount of the processing to the DC equipment corresponding to the power storage device the charged state of which is lower than that of the other power storage devices less than the amount of the processing of the other pieces of DC equipment.

* * * * *